Nov. 22, 1927.
W. N. BOOTH
DEMOUNTABLE RIM
Filed March 25, 1922
1,649,944
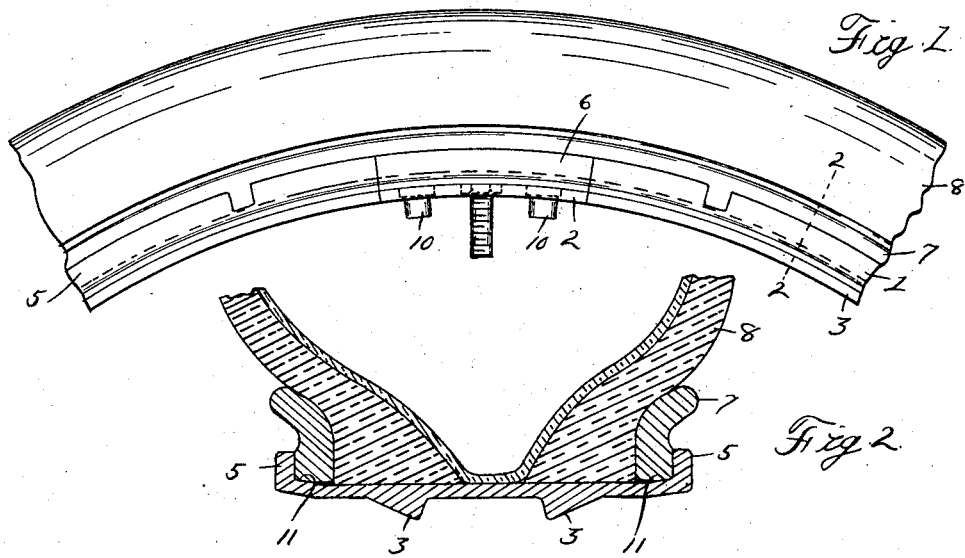
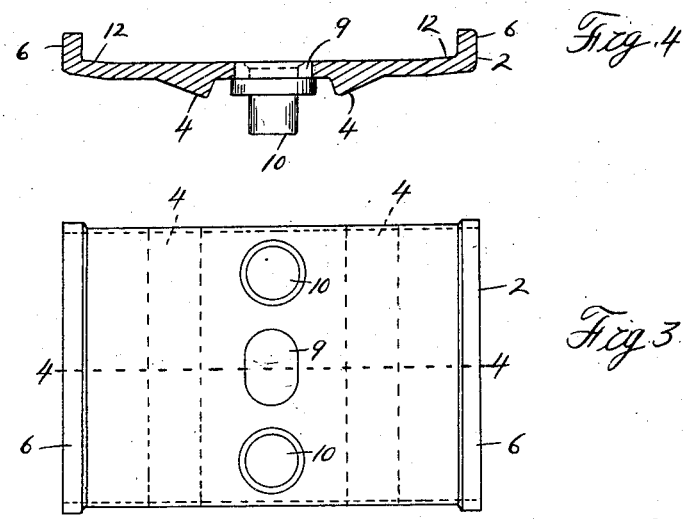
Inventor
William N. Booth Patented Nov. 22, 1927.

1,649,944

UNITED STATES PATENT OFFICE.

WILLIAM N. BOOTH, OF DETROIT, MICHIGAN.

DEMOUNTABLE RIM.

Application filed March 25, 1922. Serial No. 546,661.

The invention relates to demountable rims and refers particularly to that type of demountable rim having a transversely split main section and a filler section or bridge plate insertable between the ends of the main section. With demountable rims of this type in which the filler section is normally forced outward against tire retaining rings surrounding the main and filler sections, it has been found that after the rims have been in use for a considerable length of time, the ends of the main section have separated a distance sufficient in some cases to permit of the filler section dropping out from between the same when the rim with the inflated tire has been removed from the wheel body. This construction is therefore very objectionable, since after the rim with the inflated tire is removed from the wheel body, the filler section may drop out from between the ends of the main section permitting of the collapse of the main section and of the lateral disengagement of the tire retaining rings under the pressure exerted by the inflated tire, this pressure being sufficient to force the tire retaining rings laterally off the main section with great liability of injury to the person removing the rim with the tire.

With my invention, this objectionable feature is overcome by providing wedge surfaces between the main section of the rim and the tire retaining rings so that the lateral pressure exerted by the tire upon the tire retaining rings will move the same into firm engagement with the main section and thereby prevent the ends of the main section from separating a sufficient distance to allow the filler section to drop out from between the same. With this and other objects in view, the invention resides in the novel features of construction as more fully hereinafter set forth.

In the drawing:

Figure 1 is a side elevation of a demountable rim embodying my invention with an inflated tire applied;

Figure 2 is a cross section on the line 2—2 of Figure 1;

Figure 3 is a plan view of the filler section or bridge plate;

Figure 4 is a cross section on the line 4—4 thereof.

The demountable rim comprises the transversely split main section 1 and the filler section or bridge plate 2 fitting between the ends of the main section. Both the main and filler sections have upon the inner peripheries of their base portions the pairs of registering beads 3 and 4 respectively adapted to seat upon the wheel body. They also have the registering side flanges 5 and 6 respectively which extend radially outward from their base portions and are adapted to engage the tire retaining rings 7 between which is located the pneumatic tire 8 surrounding the main and filler sections. Both the beads and side flanges are arranged symmetrically with respect to the median planes of the main and filler sections.

To normally retain the filler section 2 from radial inward movement when fitting between the ends of the main section 1, the cooperating end bearing surfaces of the main and filler sections diverge outwardly and preferably extend radially. In the present instance the included angle or angle of divergence is approximately 17°. The filler section 2 has the centrally located peripherally extending elongated opening 9 for the passage of the valve stem of the inner tube of the tire, and it also has the projections or studs 10 adapted to engage a suitable driving device upon the wheel body, thereby preventing creeping of the demountable rim relative to the wheel body. These projections or studs are equally spaced on opposite sides of the opening 9, the whole arrangement being such that the filler section is reversible.

To prevent the accidental dropping out of the filler section from between the ends of the main section when the demountable rim with the inflated tire is removed from the wheel body, I have provided the outer periphery of the base portion of the main section 1 near the side flanges 5 with the wedge or conical bearing surfaces 11 having their greatest diameter where they merge into the side flanges. These bearing surfaces are adapted to be engaged by the tire retaining rings 7 which are laterally forced outward thereover by the lateral pressure exerted by the pneumatic tire 8 so that as long as the tire is inflated, the tire retaining rings acting upon these bearing surfaces have firm engagement with the main section of the demountable rim, and consequently hold its ends from separating and allowing the filler section to drop therebetween. The outer periphery of the base portion of the filler section adjacent to its side flanges also has wedge or conical bearing surfaces 12 corresponding to the bearing surfaces 11, so that the filler section is limited in its outward movement by the tire retaining rings and has its ends held in registration with the ends of the main section.

With the parts of the rim in assembled relation, the following operation is carried out in mounting a tire on the rim: The tire retaining rings 7 are first moved laterally inward off the wedge or conical bearing surfaces 11 and 12 of the main and filler sections respectively, to provide clearance between the inner peripheries of these rings and outer peripheries of the base portions of the main and filler sections; then the main section 1 is expanded sufficiently to permit moving the filler section 2 inwardly out of engagement, after which the main section is contracted sufficiently to permit passing either of the tire retaining rings over its side flanges. The tire 8 partially inflated, is next passed over the side flange adapted to cooperate with the removed tire retaining ring and then the tire retaining ring re-engaged with the main section, then the main section is expanded with the tire retaining rings spaced laterally inward from the wedge or conical bearing surfaces upon the main section, this main section being expanded sufficiently to permit inserting the filler section between its ends, after which the main section is contracted so that its ends engage the ends of the filler section. The tire retaining rings are then forced laterally outward to engage the conical bearing surfaces upon the base portions of the main and filler sections and the tire is inflated to hold these rings in their laterally outward positions, and to force the same into engagement with the side flanges upon the main and filler sections in the event that they do not occupy these positions before the inflation of the tire.

From the above description, it will be readily seen that I have provided a construction of demountable rim comprising a main and a filler section, and tire retaining rings surrounding these sections and adapted to occupy positions providing clearance for the expansion of the main section or effecting firm engagement with the peripheries of the base portions of the main and filler sections to prevent expansion of the main section, in which latter case, the filler section is prevented from dropping inwardly from between the ends of the main section. Also, that I have provided a construction in which the filler section is reversible and adapted to function properly in either of the two ways in which it can be inserted between the ends of the main section.

What I claim as my invention is:

1. The combination of a demountable rim having a transversely split section with the outer periphery of its base of two different diameters, and means for retaining a tire upon the rim including a tire retaining ring adapted to successively engage the differently diametered portions of the base of said section, the tire retaining ring being adapted to be held by the pressure of inflation of the tire in engagement with the portion of the base of greater diameter.

2. The combination of a demountable rim having a transversely split section with a side flange, and an outer periphery of two different diameters, the portion of said section of greater diameter being immediately adjacent to said side flange, and means for retaining a tire upon said rim including a tire retaining ring having clearance between its inner periphery and the portion of the periphery of said section of smaller diameter and having firm engagement with the portion of the periphery of said rim of greater diameter.

3. The combination of a demountable rim comprising a transversely split main section and a filler section between the ends of said main section, said main and filler sections having corresponding base portions of different diameters, and means for retaining a tire upon the rim including a tire retaining ring adapted to loosely engage the base portions of said main and filler sections of smaller diameter and to firmly engage the base portions of said main and filler sections of greater diameter and be held in engagement therewith by the pressure exerted by the tire when inflated.

4. The combination of a demountable rim comprising a transversely split section and a filler section insertable between the ends of said main section, said sections having bases and side flanges, and means for retaining a pneumatic tire upon the rim and surrounding said sections between said side flanges, said retaining means comprising laterally movable tire retaining rings between the tire and said side flanges, and wedge-shaped bearing surfaces upon the outer periphery of the base of said main section adjacent to said side flanges adapted to be engaged by said rings.

5. The combination of a demountable rim carrying a pneumatic tire, said rim comprising a transversely split main section and a filler section intermediate the ends of the main section, each section consisting of a base portion and side flanges, and tire retaining rings laterally movable and adapted to be forced into wedging engagement with the base portion of said main section adjacent said flanges by the pressure of inflation of the tire whereby the ends of the main and filler section are held in abutting relation when the tire is inflated.

6. The combination of a demountable rim comprising a transversely split main section and a filler section between the ends of said main section, said main and filler sections each having a base and a side flange, the base of said main section having portions of different diameters with the portion of greater diameter adjacent to the side flange of said main section and means for retaining a pneumatic tire upon the rim and surrounding said main and filler sections, said retaining means including a tire retaining ring alternatively engageable with the base portions of different diameters and being movable into wedging engagement with the base portion adjacent to the side flange.

In testimony whereof I affix my signature.

WILLIAM N. BOOTH.